(12) United States Patent
Maskatia et al.

(10) Patent No.: US 7,196,901 B2
(45) Date of Patent: Mar. 27, 2007

(54) PORTABLE ELECTRONIC DEVICE WITH SYNCHRONIZING UNIT

(75) Inventors: Arif Maskatia, San Jose, CA (US);
Stephen Cheung, San Jose, CA (US);
Erich Elkins, San Jose, CA (US);
Christopher Fruhauf, San Jose, CA (US)

(73) Assignee: Acer Inc., Taipei Hsien (TW)

( * ) Notice: Subject to any disclaimer, the term of this patent is extended or adjusted under 35 U.S.C. 154(b) by 749 days.

(21) Appl. No.: 10/456,538

(22) Filed: Jun. 9, 2003

(65) Prior Publication Data

US 2004/0246668 A1 Dec. 9, 2004

(51) Int. Cl.
*G06F 1/16* (2006.01)
(52) U.S. Cl. ............... 361/683; 345/156; 248/581; 292/137; 292/158
(58) Field of Classification Search ........ 361/680–686; 345/156, 164, 165, 179, 905; 312/223.1, 312/223.2; 248/581; 292/137, 158
See application file for complete search history.

(56) References Cited

U.S. PATENT DOCUMENTS

| | | | |
|---|---|---|---|
| 5,504,649 A * | 4/1996 | Hosoya et al. | 361/686 |
| 5,548,478 A | 8/1996 | Kumar et al. | |
| 6,093,039 A * | 7/2000 | Lord | 439/155 |
| 6,574,097 B2 * | 6/2003 | Hood et al. | 361/683 |
| 6,687,119 B2 * | 2/2004 | Lai et al. | 361/683 |
| 6,700,773 B1 * | 3/2004 | Adriaansen et al. | 361/680 |

\* cited by examiner

*Primary Examiner*—Lisa Lea-Edmonds
(74) *Attorney, Agent, or Firm*—Pillsbury Winthrop Shaw Pittman, LLP

(57) ABSTRACT

A portable electronic device includes an expansion base module, a pair of sliding members mounted slidably on the expansion base module, a system module connected to the sliding members, and a synchronizing unit including a pair of first front and rear pulleys, a pair of second front and rear pulleys, and an endless cord that is connected to the sliding members and that trains on the first front and rear and second front and rear pulleys in such a manner to permit synchronous sliding movements of the sliding members.

11 Claims, 7 Drawing Sheets

PORTABLE ELECTRONIC DEVICE WITH SYNCHRONIZING UNIT

BACKGROUND OF THE INVENTION

1. Field of the Invention

This invention relates to a portable electronic device with a synchronizing unit for synchronizing sliding movements of two opposite sides of a system module on an expansion base module.

2. Description of the Related Art

FIGS. 1 and 2 illustrate a conventional portable computer disclosed in U.S. Pat. No. 5,548,478. The portable computer includes a base module 91 formed with a pair of opposite rail grooves 911, and a display panel 92 that is mounted pivotally and slidably on the base module 91 through a pair of pivot pins 921 that respectively extend into the rail grooves 911. The display module 92 is pivotable relative to the base module 91 so as to overlay on the base module 91 as illustrated in FIG. 2 when the display module 92 is slid to a front end of the base module 91. As such, the portable computer can serve as a tablet computer.

The conventional portable computer is disadvantageous in that the display module 92 tends to be tilted or unbalanced with respect to the base module 91 during sliding on the base module 91. As a consequence, sliding movement of the system module 91 is not smooth. Moreover, a relatively large friction between the pivot pins 921 and a housing of the base module 91 occurs due to the aforesaid tilted problem, which can results in severe wearing of the pivot pins 921 and the housing of the base module 91.

The whole disclosure of U.S. Pat. No. 5,548,478 is incorporated herein by reference.

SUMMARY OF THE INVENTION

Therefore, the object of the present invention is to provide a portable electronic device that is capable of overcoming the aforesaid drawbacks of the prior art.

According to the present invention, there is provided a portable electronic device that comprises: an expansion base module including a housing that has front and rear ends and opposite first and second sides that extend between the front and rear ends in a longitudinal direction; a pair of sliding members mounted slidably and respectively on the first and second sides of the housing and slidable relative to the expansion base module in the longitudinal direction between the front and rear ends of the housing; a system module connected to the sliding members so as to co-slide therewith; and a synchronizing unit mounted in the housing and connected to the sliding members so as to synchronize sliding movements of the sliding members in the longitudinal direction. The synchronizing unit includes a pair of first front and rear pulleys that are disposed adjacent to the first side of the housing and that are aligned with each other in the longitudinal direction, and a pair of second front and rear pulleys that are disposed adjacent to the second side of the housing and that are aligned with each other in the longitudinal direction. The synchronizing unit further includes an endless cord that trains on the first front and rear pulleys and the second front and rear pulleys in such a manner to define a first segment thereof that extends from the first front pulley to the first rear pulley, and a second segment thereof that extends from the second front pulley to the second rear pulley, and in such a manner to permit synchronous sliding movements of the first and second segments in the same direction. The sliding members are respectively secured to the first and second segments of the cord so as to co-slide therewith.

BRIEF DESCRIPTION OF THE DRAWINGS

In drawings which illustrate embodiments of the invention.

DETAILED DESCRIPTION OF THE PREFERRED EMBODIMENTS

Figure 1:
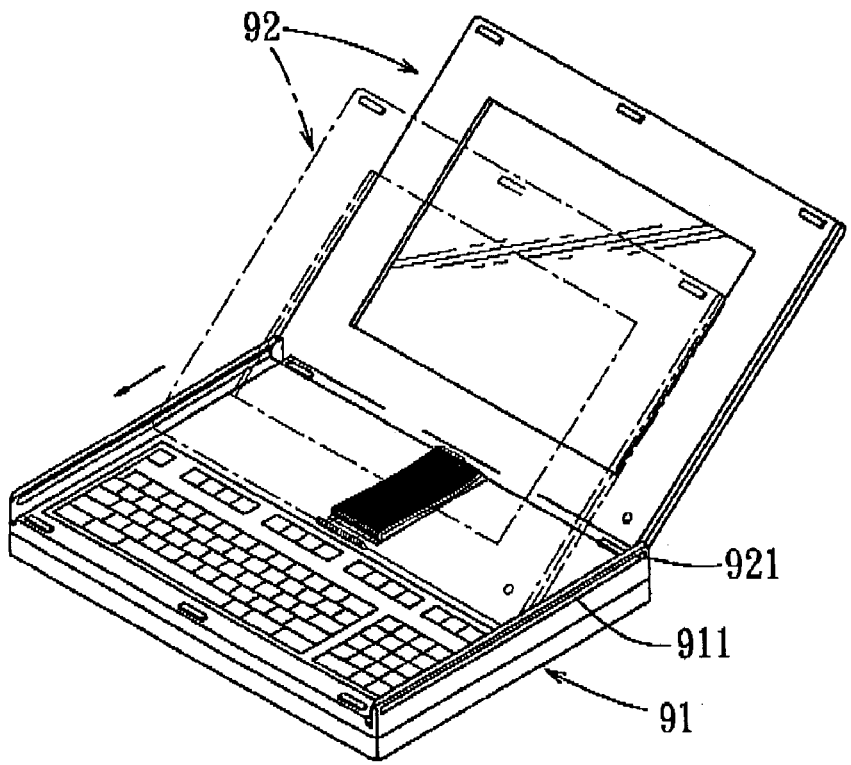
FIG. 1 is a perspective view of a conventional portable computer with a display panel disposed in an upwardly inclined state relative to a base module.
Figure 2:
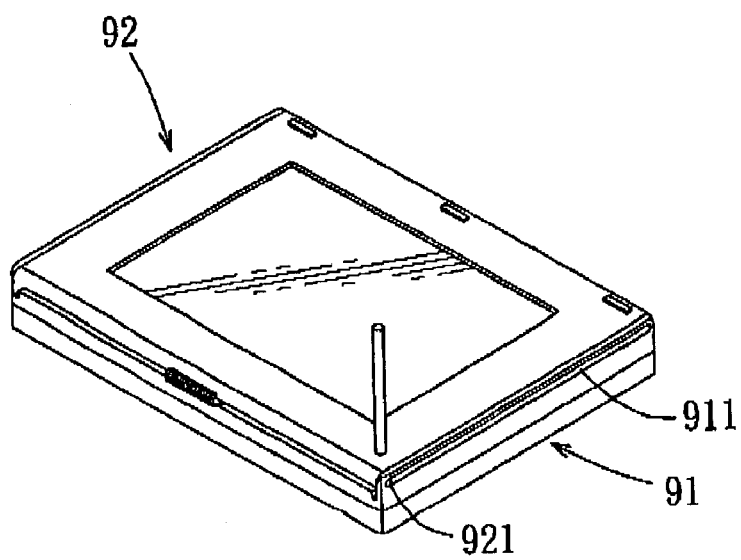
FIG. 2 is a perspective view of the portable computer of FIG. 1 with the display panel disposed in a horizontal state relative to the base module.
Figure 3:
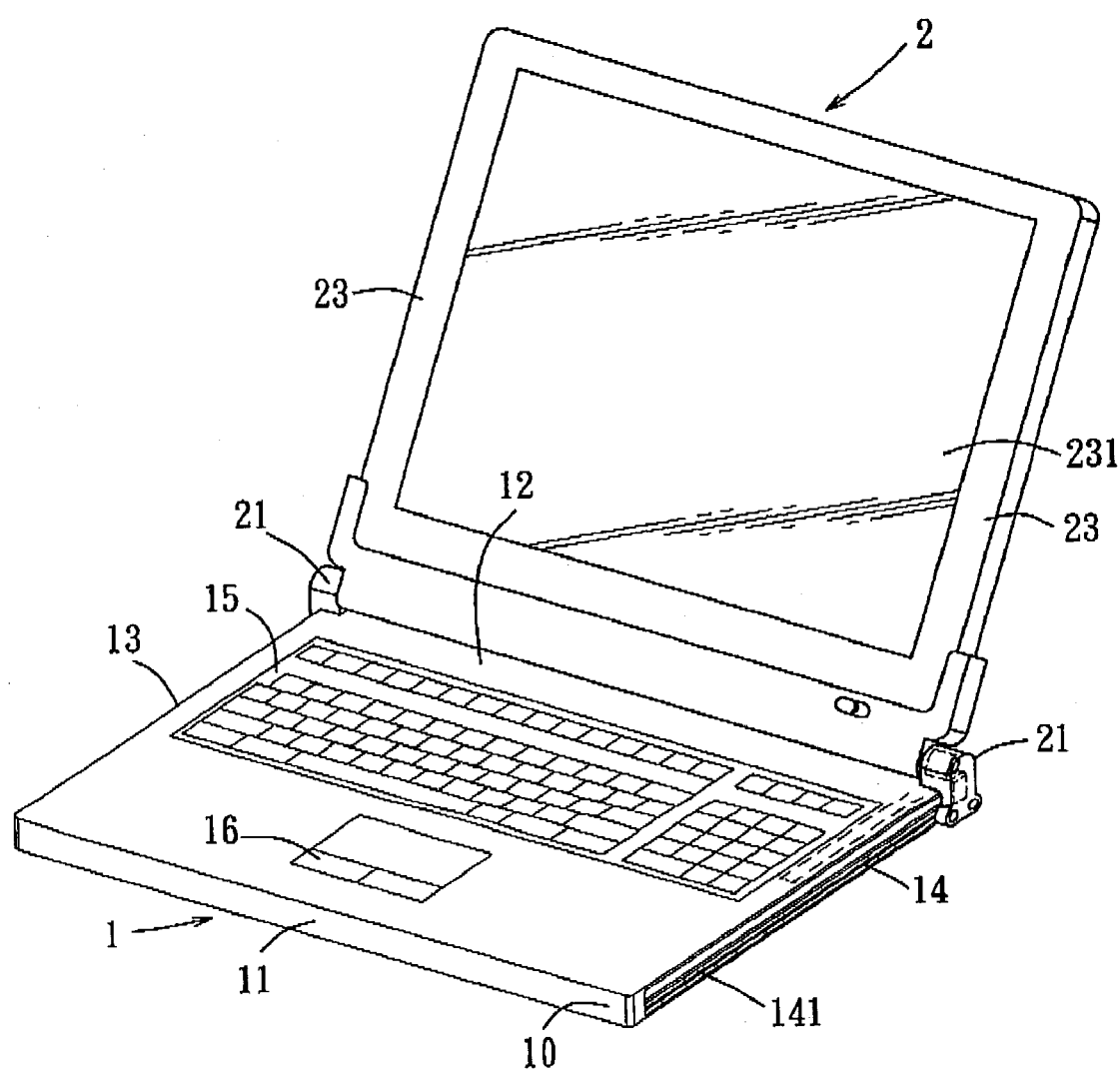
FIG. 3 is a perspective view of the first preferred embodiment of a portable computer according to this invention.
Figure 4:
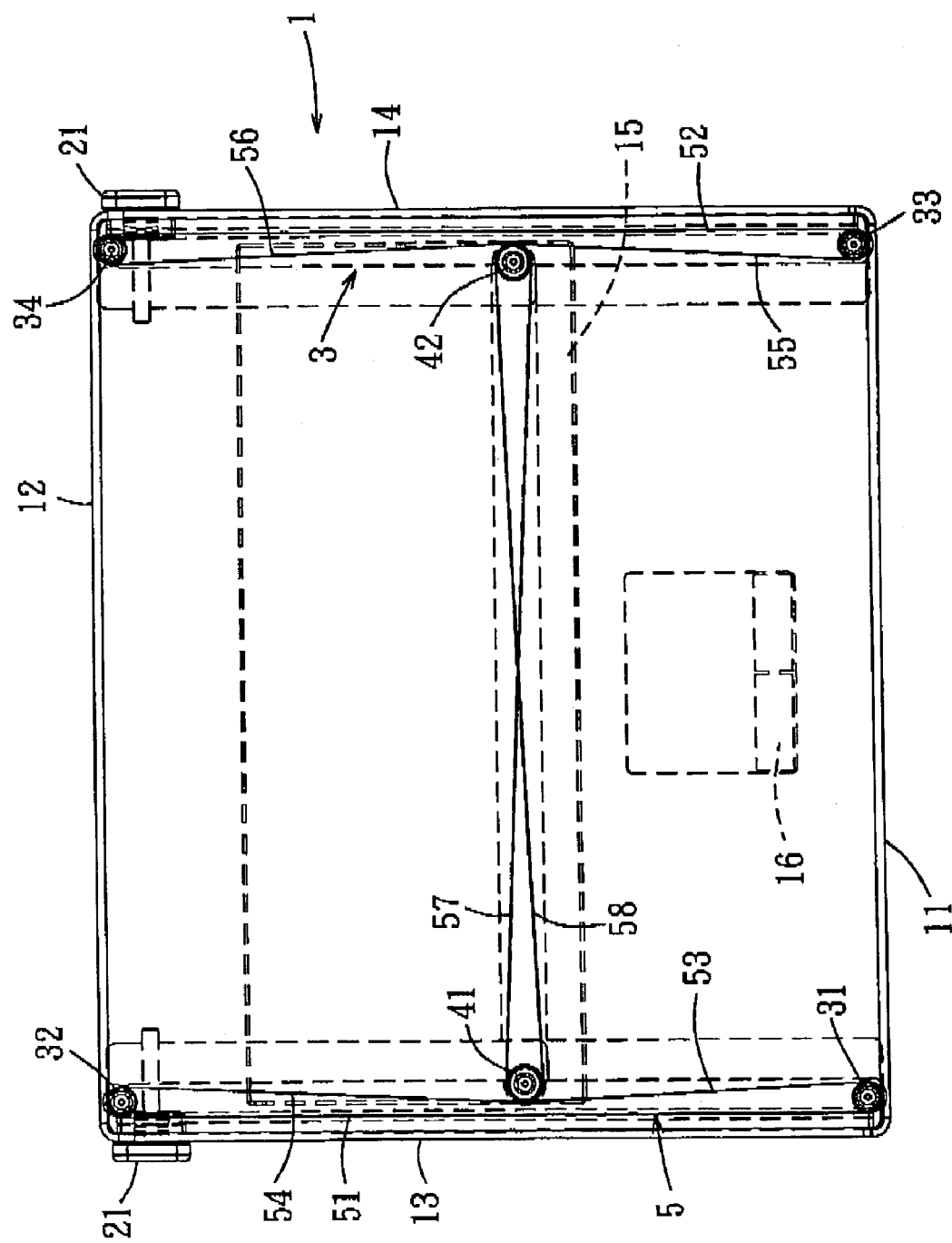
FIG. 4 is a fragmentary schematic view to illustrate how sliding movements of a pair of sliding members are synchronized through a synchronizing unit of the portable computer of FIG. 3.
Figure 5:
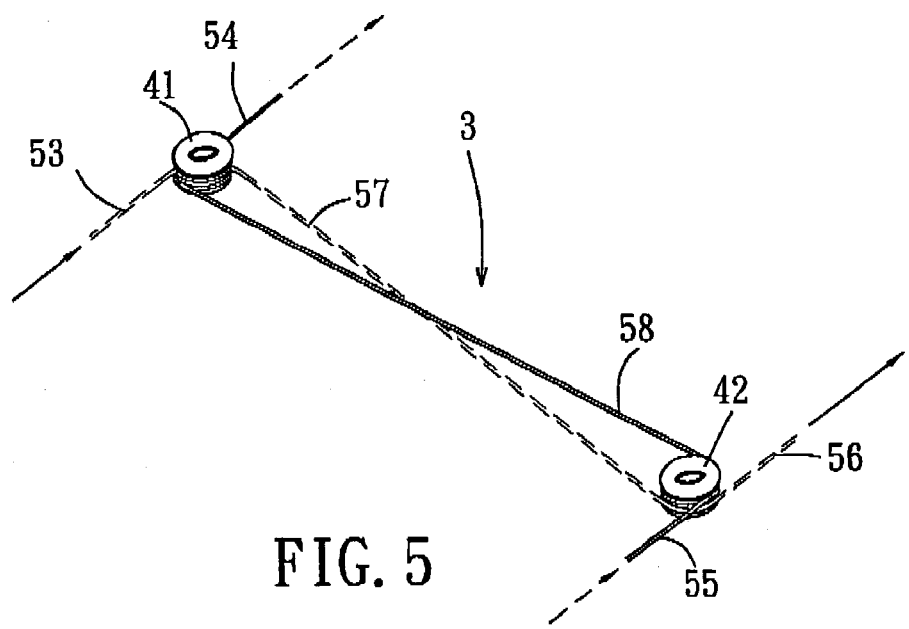
FIG. 5 is a fragmentary perspective view of the synchronizing unit of FIG. 4.
Figure 6:
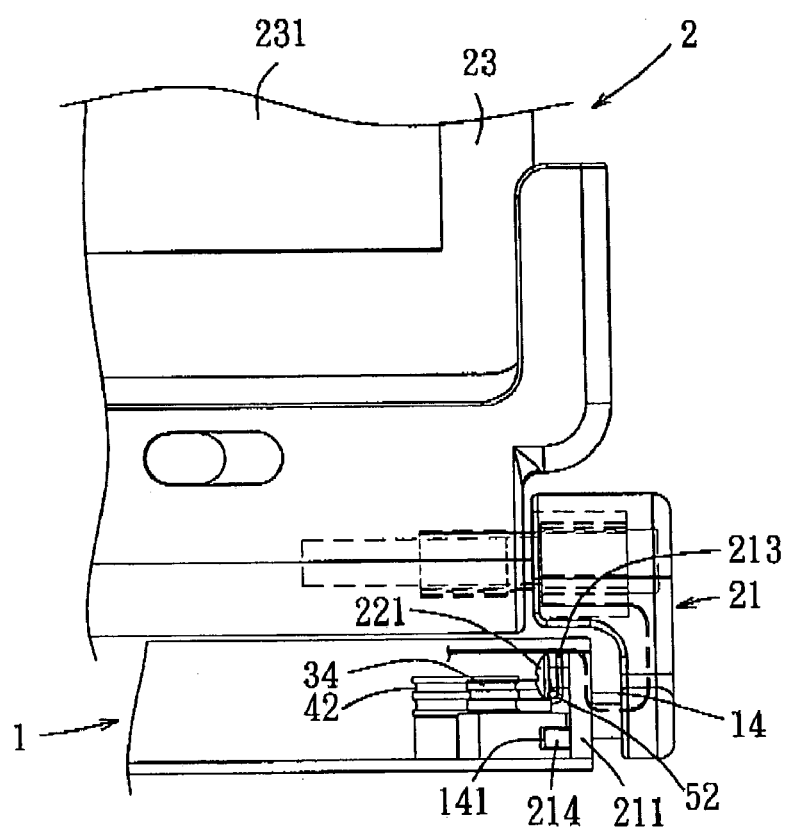
FIG. 6 is a fragmentary front view of the portable computer of FIG. 3.
Figure 7:
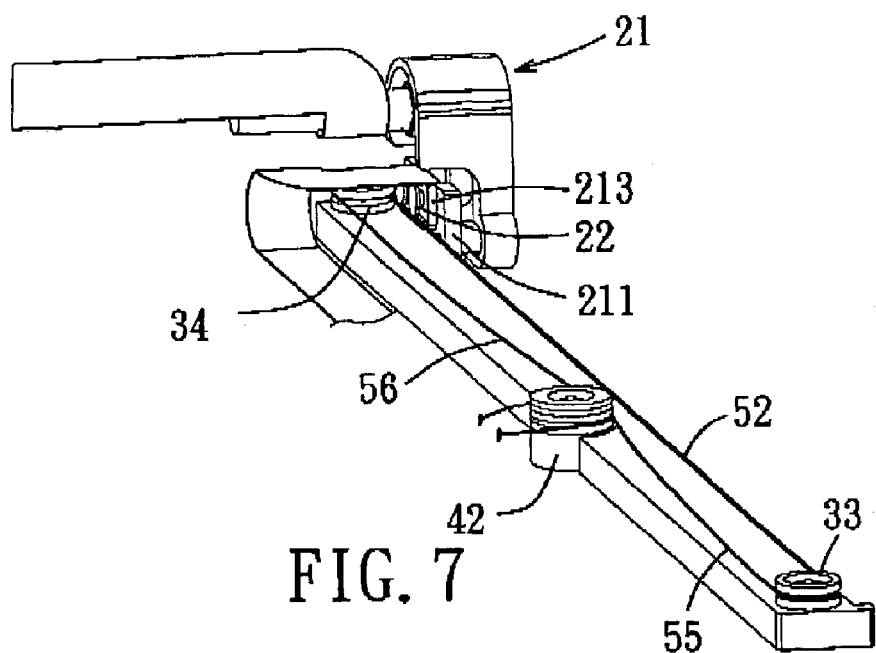
FIG. 7 is a fragmentary perspective view of the portable computer of FIG. 3 that is viewed from an angle.
Figure 8:
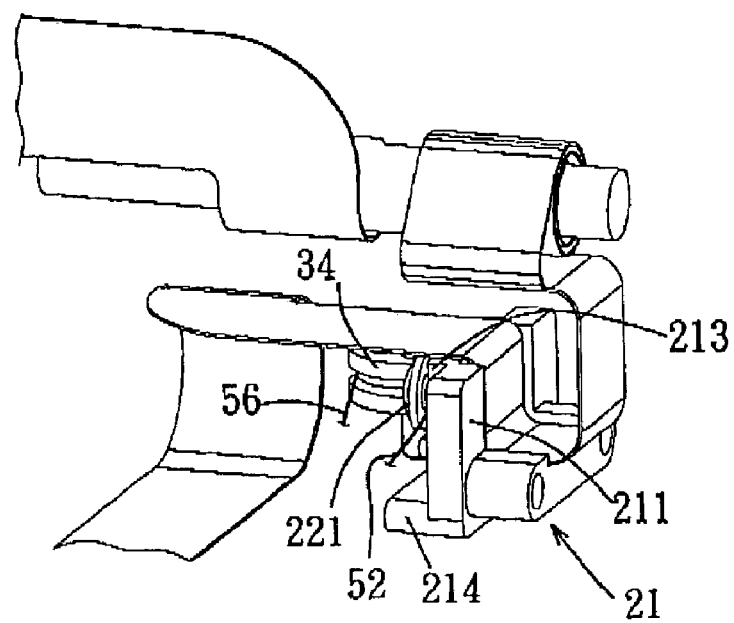
FIG. 8 is a fragmentary perspective view of the portable computer of FIG. 3 that is viewed from another angle.

For the sake of brevity, like elements are denoted by the same reference numerals throughout the disclosure.

This invention relates to a portable electronic device, such as a portable computer, a palm PC, a pocket PC, or a cellular phone.

FIGS. 3 to 8 illustrate the first preferred embodiment of a portable computer according to the present invention. The portable computer combines an expansion base module 1 and a system module 2, such as a liquid crystal display (LCD) panel, a touch input panel, or a slate computer (which normally includes a mother board, a CPU, a memory Unit, a display panel, a hard disc, a battery unit, and electronic components which allow the computer slate to function as a portable computer).

The expansion base module 1 includes a housing 10 that has front and rear ends 11, 12 and opposite first and second sides 13, 14 that extend between the front and rear ends 11, 12 in a longitudinal direction; a pair of sliding members 21 mounted slidably and respectively on the first and second sides 13, 14 of the housing 10 and slidable relative to the expansion base module 1 in the longitudinal direction between the front and rear ends 11, 12 of the housing 10.

The system module 2 has two opposite sides 23 that are respectively connected to the sliding members 21 so as to co-slide therewith.

A synchronizing unit 3 is mounted in the housing 10, and is connected to the sliding members 21 so as to synchronize sliding movements of the sliding members 21 in the longitudinal direction. The synchronizing unit 3 includes a pair of first front and rear pulleys 31, 32 that are disposed adjacent to the first side 13 of the housing 10 and that are aligned with each other in the longitudinal direction, a pair of second front and rear pulleys 33, 34 that are disposed adjacent to the second side 14 of the housing 10 and that are aligned with each other in the longitudinal direction, and a pair of third pulleys 41, 42 that are aligned with each other in a transverse direction relative to the longitudinal direction. One of the third pulleys 41 is disposed between the first front and rear pulleys 31, 32. The other of the third pulleys 42 is disposed between the second front and rear pulleys 33, 34. The synchronizing unit 3 further includes an endless cord 5 that trains on the first front and rear, second front and rear, and third pulleys 31, 32, 33, 34, 41, 42 in such a manner to define a first segment 51 thereof that extends from the first front pulley 31 to the first rear pulley 32, and a second segment 52 thereof that extends from the second front pulley 33 to the second rear pulley 34, and in such a manner to permit synchronous sliding movements of the first and second segments 51, 52 in the same direction. The sliding members 21 are respectively secured to the first and second segments 51, 52 of the cord 5 so as to co-slide therewith.

The endless cord 5 further includes a third segment 53 that extends from the first segment 51 at the first front pulley 31 to the one of the third pulleys 41, a fourth segment 54 that extends from the first segment 51 at the first rear pulley 32 to the one of the third pulleys 41 and that intersects the third segment 53 at the one of the third pulleys 41, a fifth segment 55 that extends from the second segment 52 at the second front pulley 33 to the other of the third pulleys 42, a sixth segment 56 that extends from the second segment 52 at the second rear pulley 34 to the other of the third pulleys 42 and that intersects the fifth segment 55 at the other of the third pulleys 42, a seventh segment 57 that extends from the third segment 53 at the one of the third pulleys 41 to connect with the sixth segment 56 at the other of the third pulleys 42, and an eighth segment 58 that extends from the fourth segment 54 at the one of the third pulleys 41 to connect with the fifth segment 55 at the other of the third pulleys 42 and that intersects the seventh segment 57 at a center position between the third pulleys 41, 42.

Each of the first front and rear, second front and rear, and third pulleys 31, 32, 33, 34, 41, 42 is in the form of an idler pulley. Each of the third pulleys 41, 42 is formed with two annular grooves for passage of the third and fourth segments 53, 54 and the fifth and sixth segments 55, 56, and for preventing interference between the third and fourth segments 53, 54 and between the fifth and sixth segments 55, 56.

With reference to FIGS. 3, 6, 7 and 8, each of the first and second sides 13, 14 of the housing 10 is formed with a rail groove 141. Each of the sliding members 21 includes a mounting plate 211 disposed adjacent to the rail groove 141 in a respective one of the first and second sides 13, 14 of the housing 10, an upper protrusion 213 projecting from the mounting plate 211 into the housing 10, and a lower protrusion 214 projecting from a bottom end of the mounting plate 211 through the rail groove 141 and into the housing 10 so as to permit sliding movement of the sliding members 21 on the housing 10. Each of the sliding members 21 is secured to the respective one of the first and second segments 51, 52 of the cord 5 through screw means 22 which extends into the upper protrusion 213 and which has an enlarged head 221 that cooperates with the upper protrusion 213 to define a clamping space therebetween. Each of the first and second segments 51, 52 extends through the clamping space, and is clamped between the upper protrusion 213 and the enlarged head 221 of the screw means 22.

The expansion base module 1 may include a keyboard 15, a touch pad 16, and expansion peripheral components (not shown), such as expansion hard disc, CD-ROM, and battery.

The system module 2 may includes a computer slate with an LCD display panel 231, a circuit board (not shown), a CPU (not shown), and a memory module (not shown).

Figure 9:
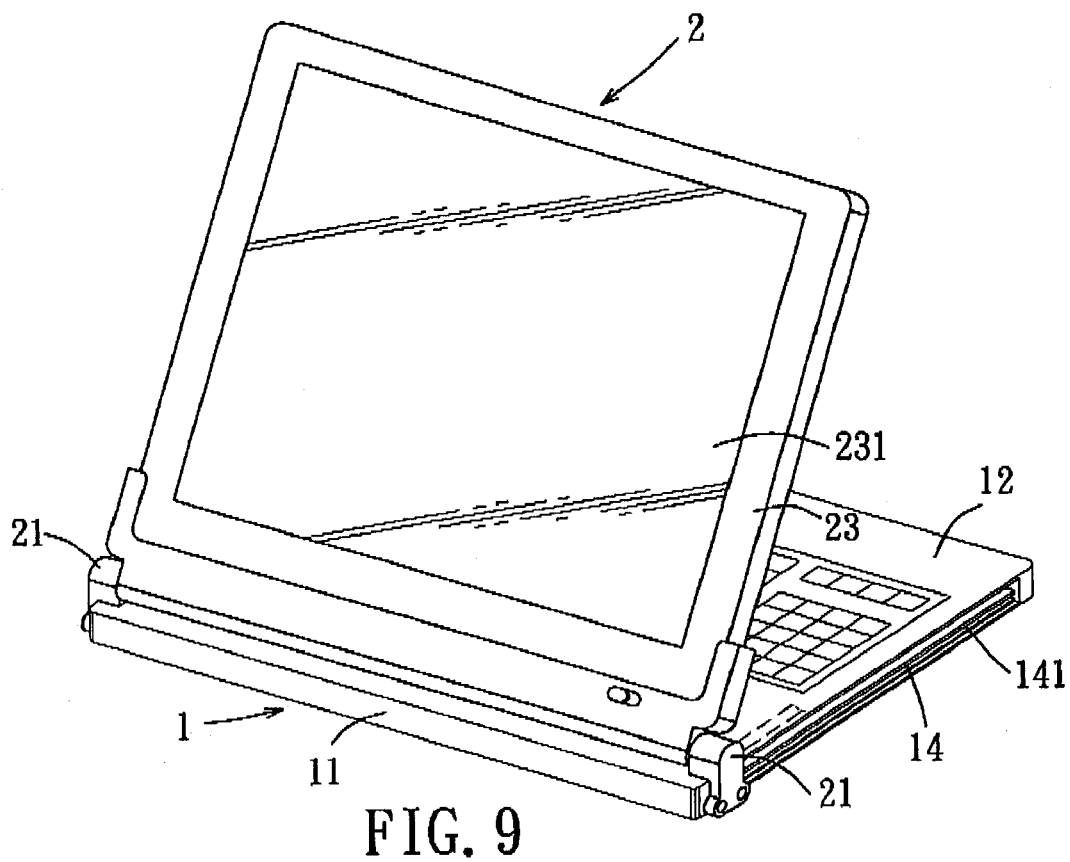
FIG. 9 is a perspective view of the portable computer of FIG. 3 with a system module slid to a front end of an expansion base module.
Figure 10:
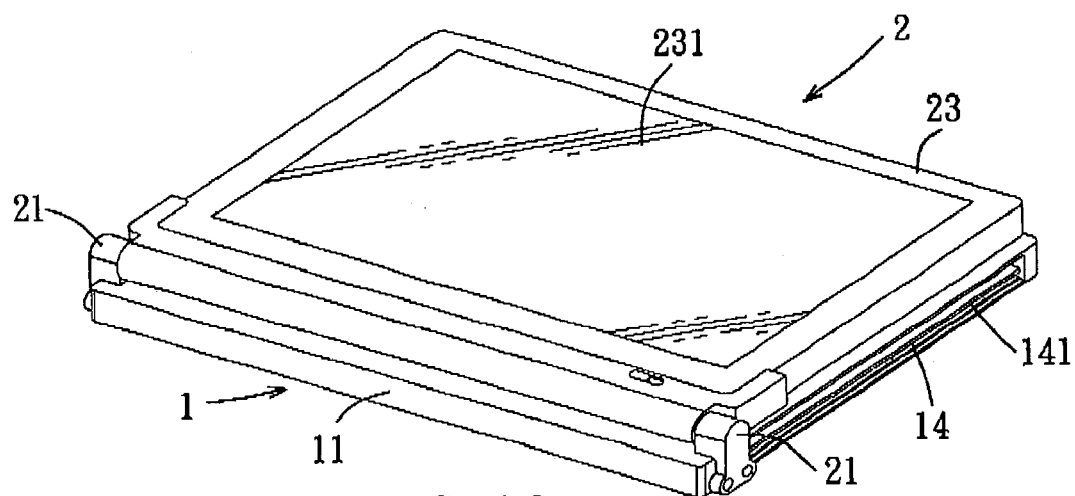
FIG. 10 is a perspective view of the portable computer of FIG. 3 with the system module pivoted to a horizontal position to overlay on the expansion base module.

With reference to FIGS. 9 and 10, the portable computer of this invention can be easily converted into a tablet computer by sliding the system module 2 to the front end 11 of the expansion base module 1 and subsequently pivoting the system module 2 relative to the expansion base module 1 to a horizontal position to overlay on the expansion base module 1.

Figure 11:
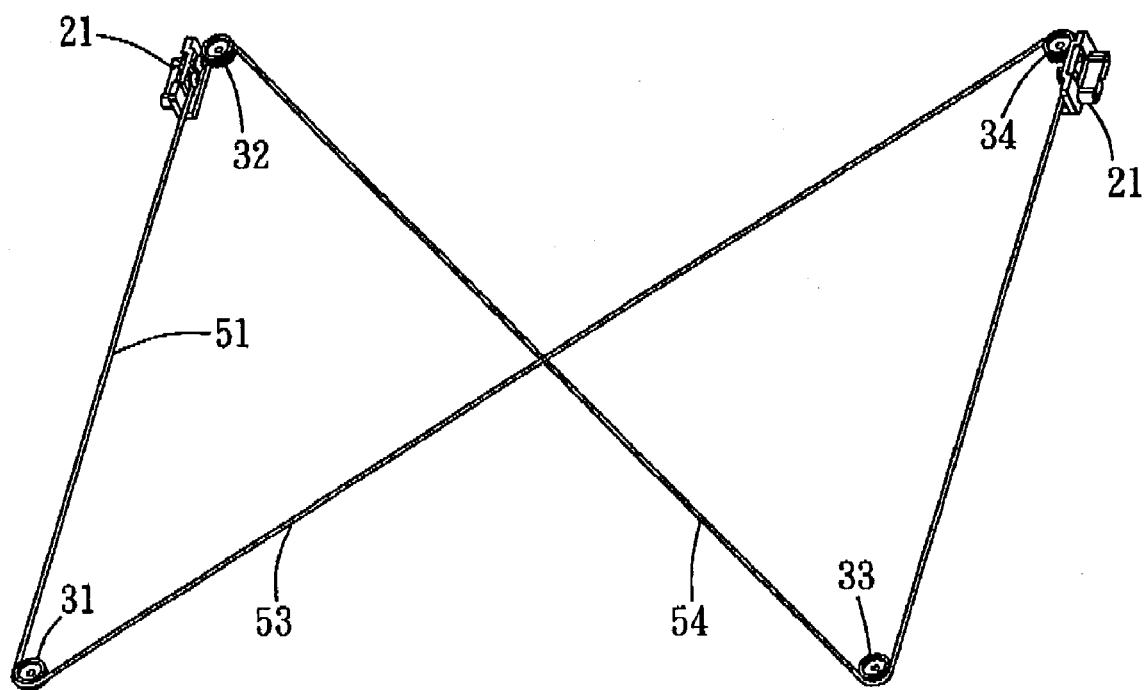
FIG. 11 is a fragmentary schematic perspective view of the second preferred embodiment of the portable computer according to this invention.

FIG. 11 illustrates the second preferred embodiment of the portable computer of this invention which is similar to the previous embodiment, except that the third pulleys 41, 42 are removed from the synchronizing unit 3. The endless cord 5 includes a first segment 51 that extends from the first front pulley 31 to the first rear pulley 32, a second segment 52 that extends from the second front pulley 33 to the second rear pulley 34, a third segment 53 that extends from the first segment 51 at the first front pulley 31 to the second rear pulley 34 to connect with the second segment 52, and a fourth segment 54 that extends from the first segment 51 at the first rear pulley 32 to the second front pulley 33 to connect with the second segment 52 and that intersects the third segment 53 at a center position among the first front and rear pulleys 31, 32 and second front and rear pulleys 33, 34. Similar to the previous embodiment, the arrangement of the first front and rear pulleys 31, 32, the second front and rear pulleys 33, 34, and the endless cord 5 permits synchronizing movements of the sliding members 21, which are respectively secured to the first and second segments 51, 52, in the same direction.

With the invention thus explained, it is apparent that various modifications and variations can be made without departing from the spirit of the present invention.

We claim:

1. A portable electronic device comprising:
   an expansion base module including a housing that has front and rear ends and opposite first and second sides that extend between said front and rear ends in a longitudinal direction;
   a pair of sliding members mounted slidably and respectively on said first and second sides of said housing and slidable relative to said expansion base module in said longitudinal direction between said front and rear ends of said housing;
   a system module connected to said sliding members so as to co-slide therewith; and
   a synchronizing unit mounted in said housing and connected to said sliding members so as to synchronize sliding movements of said sliding members in said longitudinal direction, said synchronizing unit including a pair of first front and rear pulleys that are disposed adjacent to said first side of said housing and that are aligned with each other in said longitudinal direction, and a pair of second front and rear pulleys that are disposed adjacent to said second side of said housing and that are aligned with each other in said longitudinal direction, said synchronizing unit further including an endless cord that trains on said first front and rear pulleys and said second front and rear pulleys in such a manner to define a first segment thereof that extends from said first front pulley to said first rear pulley, and a second segment thereof that extends from said second front pulley to said second rear pulley, and in such a manner to permit synchronous sliding movements of said first and second segments in the same direction, said sliding members being respectively secured to said first and second segments of said cord so as to co-slide therewith.

2. The portable electronic device of claim 1, wherein said synchronizing unit further includes a pair of third pulleys that are aligned with each other in a transverse direction relative to said longitudinal direction, one of said third pulleys being disposed between said first front and rear pulleys, the other of said third pulleys being disposed between said second front and rear pulleys.

3. The portable electronic device of claim 2, wherein said endless cord further includes a third segment that extends from said first segment at said first front pulley to said one of said third pulleys, a fourth segment that extends from said first segment at said first rear pulley to said one of said third pulleys and that intersects said third segment at said one of said third pulleys, a fifth segment that extends from said second segment at said second front pulley to the other of said third pulleys, a sixth segment that extends from said second segment at said second rear pulley to the other of said third pulleys and that intersects said fifth segment at the other of said third pulleys, a seventh segment that extends from said third segment at said one of said third pulleys to connect with said sixth segment at the other of said third pulleys, and an eighth segment that extends from said fourth segment at said one of said third pulleys to connect with said fifth segment at the other of said third pulleys and that intersects said seventh segment at a center position between said third pulleys.

4. The portable electronic device of claim 3, wherein each of said first front and rear, second front and rear, and third pulleys is in the form of an idler pulley.

5. The portable electronic device of claim 3, wherein each of said third pulleys is formed with two annular grooves.

6. The portable electronic device of claim 3, wherein each of said first and second sides of said housing is formed with a rail groove, each of said sliding members including a mounting plate disposed adjacent to said rail groove in a respective one of said first and second sides of said housing, an upper protrusion projecting from said mounting plate into said housing, and a lower protrusion projecting from a bottom end into said housing so as to permit sliding movement of said sliding members on said housing, said portable electronic device further comprising screw means, each of said sliding members being secured to the respective one of said first and second segments of said cord through said screw means which extends into said upper protrusion and which has an enlarged head that cooperates with said upper protrusion to define a clamping space therebetween, each of said first and second segments extending through said clamping space, and being clamped between said upper protrusion and said enlarged head of said screw means.

7. The portable electronic device of claim 1, wherein said endless cord further includes a third segment that extends from said first segment at said first front pulley to said second rear pulley to connect with said second segment, and a fourth segment that extends from said first segment at said first rear pulley to said second front pulley to connect with said second segment and that intersects said third segment at a center position among said first front and rear pulleys and second front and rear pulleys.

8. A portable computer comprising;
an expansion base module including a housing that has front and rear ends and opposite first and second sides that extend between said front and rear ends in a longitudinal direction, said expansion base including a keyboard;

a pair of sliding members mounted slidably and respectively on said first and second sides of said housing and slidable relative to said expansion base module in said longitudinal direction between said front and rear ends of said housing;

a system module connected to said sliding members so as to co-slide therewith and including a computer slate; and a synchronizing unit mounted in said housing and connected to said sliding members so as to synchronize sliding movements of said sliding members in said longitudinal direction, said synchronizing unit including a pair of first front and rear pulleys that are disposed adjacent to said first side of said housing and that are aligned with each other in said longitudinal direction, and a pair of second front and rear pulleys that are disposed adjacent to said second side of said housing and that are aligned with each other in said longitudinal direction, said synchronizing unit further including an endless cord that trains on said first front and rear pulleys, and said second front and rear pulleys in such a manner to define a first segment thereof that extends from said first front pulley to said first rear pulley, and a second segment thereof that extends from said second front pulley to said second rear pulley, and in such a manner to permit synchronous sliding movements of said first and second segments in the same direction, said sliding members being respectively secured to said first and second segments of said cord so as to co-slide therewith.

9. The portable computer of claim 8, wherein said synchronizing unit further includes a pair of third pulleys that are aligned with each other in a transverse direction relative to said longitudinal direction, one of said third pulleys being disposed between said first front and rear pulleys, the other of said third pulleys being disposed between said second front and rear pulleys.

10. The portable computer of claim 9, wherein said endless cord further includes a third segment that extends from said first segment at said first front pulley to said one of said third pulleys, a fourth segment that extends from said first segment at said first rear pulley to said one of said third pulleys and that intersects said third segment at said one of said third pulleys, a fifth segment that extends from said second segment at said second front pulley to the other of said third pulleys, a sixth segment that extends from said second segment at said second rear pulley to the other of said third pulleys and that intersects said fifth segment at the other of said third pulleys, a seventh segment that extends from said third segment at said one of said third pulleys to connect with said sixth segment at the other of said third pulleys, and an eighth segment that extends from said fourth segment at said one of said third pulleys to connect with said fifth segment at the other of said third pulleys and that intersects said seventh segment at a center position between said third pulleys.

11. The portable computer of claim 8, wherein said endless cord further includes a third segment that extends from said first segment at said first front pulley to said second rear pulley to connect with said second segment, and a fourth segment that extends from said first segment at said first rear pulley to said second front pulley to connect with said second segment and that intersects said third segment at a center position among said first front and rear pulleys and second front and rear pulleys.

* * * * *